Figure 3A:
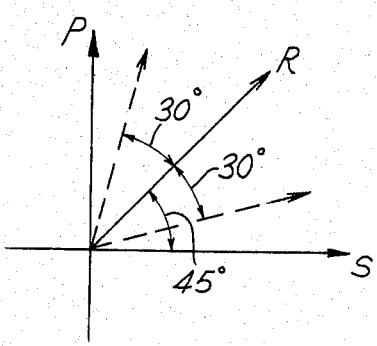

United States Patent [19]
Downs

[11] Patent Number: 4,534,649
[45] Date of Patent: Aug. 13, 1985

[54] SURFACE PROFILE INTERFEROMETER

[76] Inventor: Michael J. Downs, 'Karibu', Furza Hill Rd., Headley Down, Hampshire, England

[21] Appl. No.: 436,336

[22] Filed: Oct. 22, 1982

[30] Foreign Application Priority Data

Oct. 30, 1981 [GB] United Kingdom ............... 8132745

[51] Int. Cl.³ .............................................. G01B 9/02
[52] U.S. Cl. ..................................... 356/351; 356/359
[58] Field of Search ............... 356/351, 357, 359, 360; 350/510, 411

[56] References Cited

U.S. PATENT DOCUMENTS 4,358,201 11/1982 Makosch ............................ 356/351

OTHER PUBLICATIONS

Reiter, "Polarisationsinterferometer zur Aufzeichnung von kleinen, schnellen Winkel-und-Relativbewegungen", *Frequenz*, vol. 29, pp. 88-91, 1975.

In Journal of Physics E, 1972 vol. 5, pp. 445 to 449, King et al. compare methods of film thickness measurement.

In Photoelectric Spectrometry Group Bulletin, No. 16, Dec. 1965, pp. 487 to 492, King reviews trends in spectropolarimeter design.

*Primary Examiner*—Davis L. Willis
*Assistant Examiner*—Matthew W. Koren
*Attorney, Agent, or Firm*—Cushman, Darby & Cushman

[57] ABSTRACT

In a surface profile interferometer, a test surface is illuminated by a beam having components at orthogonal directions of polarization which are focused at different axial distances so that the areas of intersection with the surface differ by a factor of ten or more, and any phase difference introduced by reflection by the surface is sensed by an interference technique. Alternatively, the beam components are focused at equal distances but are laterally separated.

10 Claims, 11 Drawing Figures

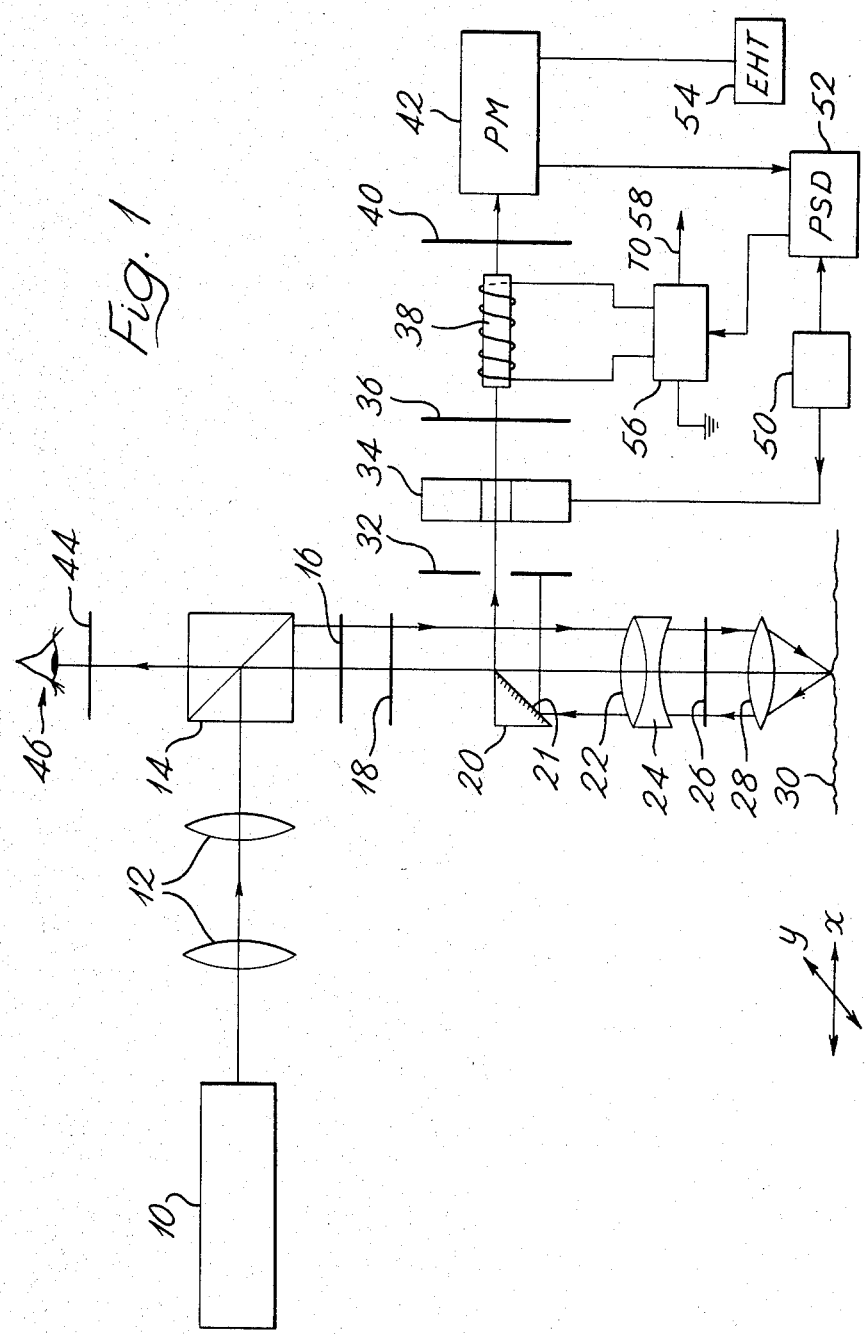

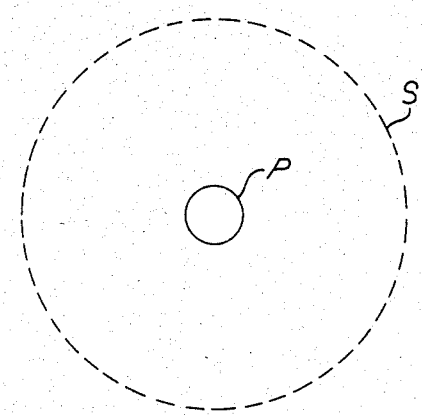
Fig. 2a
Fig. 2b
 
Fig. 2c
Fig. 2d
 
Fig. 2e

SURFACE PROFILE INTERFEROMETER

This invention relates to a surface profile interferometer, that is, a device for determining surface roughness, or the height of a step change in thickness caused for example by the application of a metal film to a substrate to form a printed circuit board or an integrated microcircuit.

In the Journal of Physics E, 1972, Volume 5, pages 445 to 449, King et al describe three methods of determining film thickness by measuring step height at the edge of a film. In one method, a mechanical stylus is moved over the surface but it must contact the surface and may therefore cause damage. In another method a multiple beam interferometer is provided; a microscope system is used to image multiple beam interference fringes on to a photographic film and the thus recorded interferogram interpreted to measure step-height. A disadvantage of this arrangement is that, before a measurement can be made, the photographic film must be developed.

In a third arrangement, in a photoelectric shearing interferometer, polarised light is passed through a slit and through a Wollaston prism and a microscope objective lens so as to form two images of the slit adjacent to the step change in height on a test surface. The beams reflected by the surface pass through the lens and the prism and an image is formed by two orthogonally polarised beams which have a phase difference depending on the height of the step. This phase difference is measured by the linear manual movement of a weak lens transverse to the beam until the phase difference is exactly cancelled; this condition is determined by use of an electro-optic modulator, an analyser, a photomultiplier and a phase sensitive detector, which are used to detect the position of phase equality of the two interfering beams. The accuracy of the system depends on the precision to which the linear movement of the weak lens can be measured. Further, it is not a common path device. The two interfering beams travel along spatially separated optical paths so that any tilt of the surface will affect the measurement.

Another use of an electro-optic modulator is in polarimetry, see for example the paper by King in Photoelectric Spectrometry Group Bulletin No. 16, December 1965, pages 487 to 492, in which a magneto-optic modulator known as a Faraday cell is used directly to compensate for the difference in polarisation and a measurement is made of the current fed to the cell to cause a rotation of vibration plane of a plane polarised beam to achieve a required condition, as detected by a phase sensitive detector. Such an arrangement can be used to determine very small changes in the vibration plane of linearly polarised light caused for example by optical rotary dispersion or rotation.

It is to be noted that of the two optical methods of step height measurement referred to above, the multiple beam interferometer does not depend on measurement of the phase difference between two orthogonally polarised beams, and in the photoelectric shearing interferometer, difference in phase between two orthogonal polarisations is measured but the beams are laterally displaced by the Wollaston prism, so that the system is not a common-path interferometer.

In this specification, an interferometer system is disclosed in which the two interfering beams travel a common path, so that the interferometer is insensitive to tilt of a test object, and in which polarisation techniques are used to provide extremely high measurement sensitivity. In some embodiments, a truly common-path polarisation interferometer is provided for the first time.

According to the invention, a surface profile interferometer comprises means for providing a collimated beam of radiation having components of equal amplitude in two orthogonal directions of polarisation;

a beam directing device;

a birefringent focusing system for focusing radiation in the two directions of polarisation at different positions in space;

beam inversion means between the focusing system and the position of a test object; and phase sensing means for sensing any difference in phase between the polarised radiation components, the beam directing device being such that it allows passage of at least a part of the collimated beam to be incident upon the birefringent focusing system, receives from the birefringent focusing system radiation which has been reflected by a test surface and directs it to the phase sensing means, and has the property that it introduces essentially no difference in phase between radiation components in the two orthogonal directions of polarisation.

In a first embodiment the beam directing device is a plane reflecting surface arranged on one side of the optical axis of the interferometer radiation in the incident collimated beam.

The reflecting surface is arranged at 45° to the optical axis so as to direct to the phase detection means radiation received from a test surface by the birefringent focusing system. This effectively means that half of the interferometer aperture is used and has the advantage of preventing energy being reflected back to the radiation source.

The reflecting surface may comprise either a metal or a dielectric coating and it is convenient to use a thin film coating designed so that reflection from the surface does not introduce any phase or amplitude differences between the polarised components of the beams being reflected by the surface.

In a second embodiment the beam directing device is an essentially non-polarising beam splitter in which the product of the reflection coefficient at the first direction of polarisation and the transmission coefficient at the second direction of polarisation is substantially equal to the product of the reflection coefficient at the second direction of polarisation and the transmission coefficient at the first direction of polarisation. Double passage through such a beam splitter of a beam having orthogonally polarised components does not introduce differences of phase between the components.

The birefringent focusing system is such that it applies slightly different focusing powers to orthogonally polarised components of an incident beam. The beam inversion means interchanges the polarisation states of the beam components so that during a second passage of the beam through the focusing system after reflection by a test surface the effect of the different focusing powers is inverted. The focusing system may comprise a calcite converging lens of relatively low focal power and a converging lens of relatively high focal power, and the beam inversion means may comprise a quarter wave plate with its axes aligned at 45° to the axes of the birefringent lens.

The phase sensing means may comprise an alternating current electro-optic modulator, an electro-optic compensator such as a Faraday cell, a photomultiplier, and a phase sensitive detector arranged to provide an output signal related to any difference in phase between the two orthogonally polarised interfering beams received by the photomultiplier.

Figure 4:
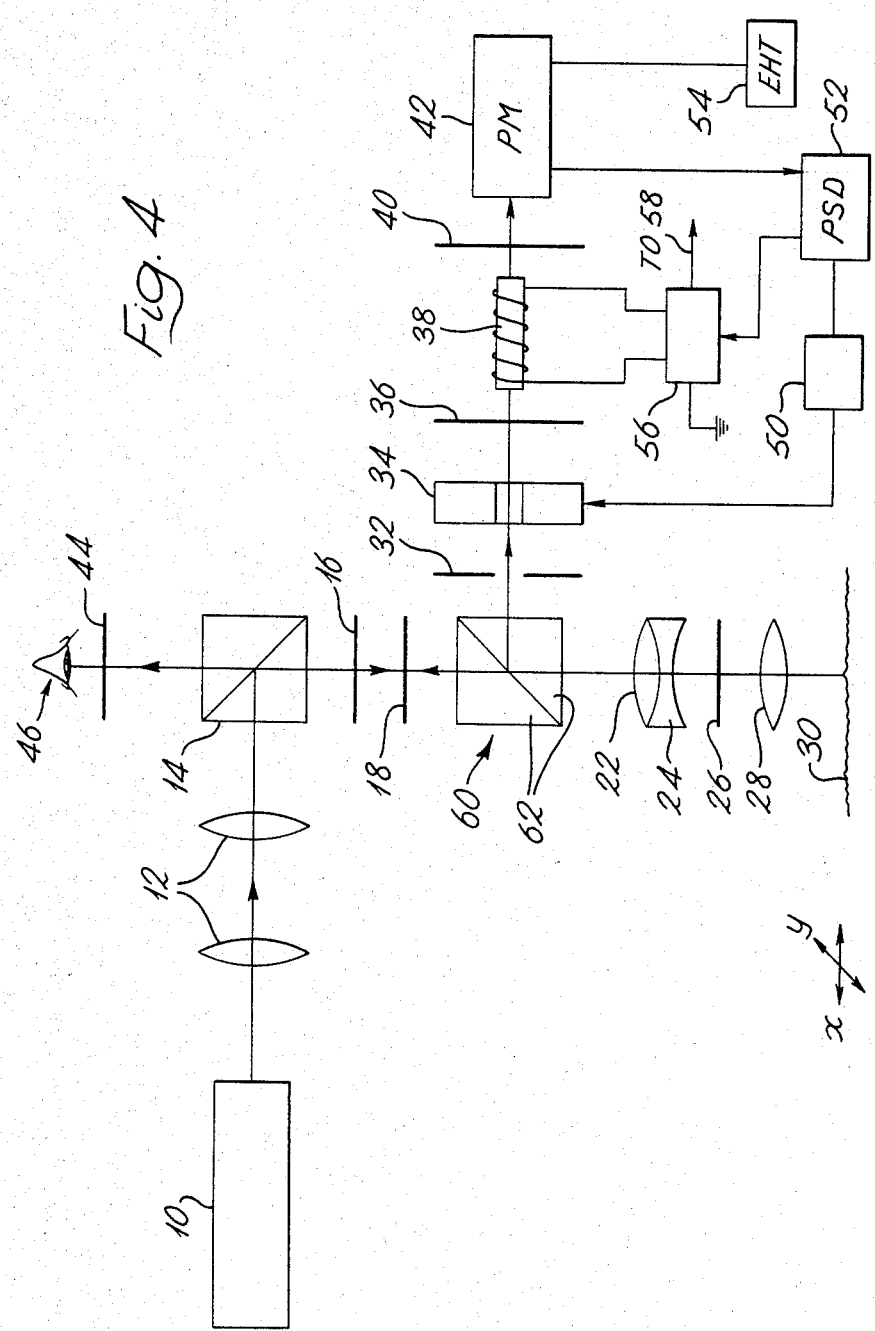

The invention will now be described by way of example only with reference to the accompanying drawings in which:

FIG. 1 illustates schematically the optical layout and the electrical control and measuring circuit of the first embodiment of the surface profile interferometer according to the invention;

FIGS. 2(a) (b) (c) (d) and (e) illustrate five possible configurations for illuminating a surface under test;

FIGS. 3(a) (b) (c) and (d) illustrate optical and electrical signals at various parts of the apparatus; and FIG. 4 illustrates schematically a second embodiment of a surface profile interferometer.

Considering first the optical paths through the apparatus, in FIG. 1 a helium neon laser 10 provides a beam of monochromatic light which passes through a beam expander 12 to a polarising beam splitter 14 which reflects some of the incident light through an angle of 90°. The collimated beam passes through a mica half wave plate 16 and a polariser 18 to a reflector 20 which intercepts half of the incident beam. The side 21 of the reflector remote from the incident beam is a mirror. The half of the beam which is not obscured by the reflector passes on one side only of the optical axis of the apparatus through a calcite converging lens 22 in contact with a silic diverging lens 24, then through a mica quarter wave plate 26 and a microscope objective lens 28 to a test surface 30. Light reflected by the surface passes, on the other side of the optical axis, back through the lens 28, plate 26, and lens doublet 22, 24 to the reflecting surface 21. The reflecting surface is arranged at 45° to the returning beam which it reflects through a limiting aperture 32, an electro-optic phase modulator 34, a quarter wave plate 36, a Faraday cell compensator 38 and a second polariser 40 to a photomultiplier 42.

Considering now the electrical circuitry, the electro-optic phase modulator 34 is connected to a modulator control circuit 50 which supplies one input signal to a phase sensitive detector (PSD) 52. The other input signal is provided by the photomultiplier 42 which has an EHT supply 54. The output signal from the PSD 52 is connected to a Faraday cell compensator circuit 56 which supplies a readout signal reference 58 which is the value of the current flowing through the Faraday cell coil.

In use the laser 10 provides a beam of plane polarised light which is expanded by expander 12. The polarising beam splitter 14 reflects this expanded beam through the mica half wave plate 16 to the polariser 18 which is set to rotate the plane of polarisation of the expanded input beam until there are beams of equal intensity in two orthogonal directions of polarisation P and S, the directions being determined by the axes of the birefringent lens. The mica half wave plate 16 is used to maximise the intensity of the light transmitted by the polariser 18 by rotating the plane of polarisation. The half of the radiation which is not intercepted by the relector 20 passes to the calcite/silica doublet 22, 24.

It is a property of the calcite convergent lens 22 that it has different refractive indices for light at different polarisations. For an incident collimated beam having both P and S components, one component will be deviated more than the other, so that the focal points of the P and S components will lie at different distances from the lens. The difference in focal power for the P and S components is small, about one dioptre. The effect of the microscope objective lens 28 is to provide a relatively powerful focusing effect, for example 100 dioptres, but a difference in focal power for the P and S components remains. The overall effect is that one component of the beam, say the P component, is precisely focused on the test surface 30 while the second component is focused at a different distance and therefore is reflected from a larger area of the surface. The different areas of illumination are illustrated in FIG. 2(a). The P component is precisely focused as a small circular spot near the resolution limit of the objective lens while the S component covers a much larger area of the test surface. Typical dimension of the diameter of the area illuminated by the focused spot is less than one micron for an eight millimeter objective while the large area illuminated by the unfocused beam may be 100 microns in diameter. The difference in areas from which the beams are reflected is therefore of the order $10^4$. The reflection by the surface does not alter the state of polarisation for small angles of incidence, but the mean surface level from which each beam is reflected alters the relationship of the two beams by introducing an optical path difference and therefore a phase difference of one beam with respect to the other. The focused spot provides surface level information about a very small part of the surface while the larger area can be regarded as a reference area because information is averaged over a relatively large part of the surface and should be invariant across the test surface. The two beams travel a common path so that the system is insensitive to movement of the test surface in a direction perpendicular to the surface, and the use of coaxial measurement and reference beams makes the system insensitive to tilt of the test surface. The reflected beams can be used to derive information either about surface roughness, i.e. height of a particular spot with reference to the general surface or to investigate changes in profile height. Usually the surface will be scanned across the illuminating beams in one of two orthogonal directions x and y or both as indicated by the arrows in FIG. 1, e.g. on a microscope stage, and the electrical output of the apparatus can provide a measure of roughness or change in profile height.

Referring once again to FIG. 1, the beams reflected by the surface pass on the other side of the optical axis back to the calcite/silica doublet 22, 24 after a second passage through the quarter wave plate 26 which is set at 45° to the axes of the birefringent lens. The effect of this double passage through the plate 26 is that the P and S beams are inverted with respect to the ordinary and extraordinary axes of the calcite lens 22 and the focusing effect of this lens on the components is therefore reversed. The beam component which was refracted more than the other in the first passage through the lens is now refracted less and vice versa. The silica diverging lens is provided to give the doublet 22, 24 a zero focal powr for the input beam focused nearer the lens, the P beam, and thus allows approximate recollimation of both beams by the doublet. The output of the doublet is therefore two coincident collimated orthogonally polarised beams whose phase difference is directly proportional to the difference in height of the test surface at the small area spot in comparison with the averaged surface height.

The beams are reflected by the reflecting surface 21 to the detecting apparatus. The reflector 20 may be a glass prism coated with aluminium, or a dielectric mirror coating may be used. In either case reflection from the surface does not essentially alter the relative phases of the P and S beam components, provided the alignment of the components and the reflecting surface is correct. Alternatively the reflector may be coated so as to introduce zero phase and amplitude change between the orthogonally polarised components at any alignment.

Figure 3B:
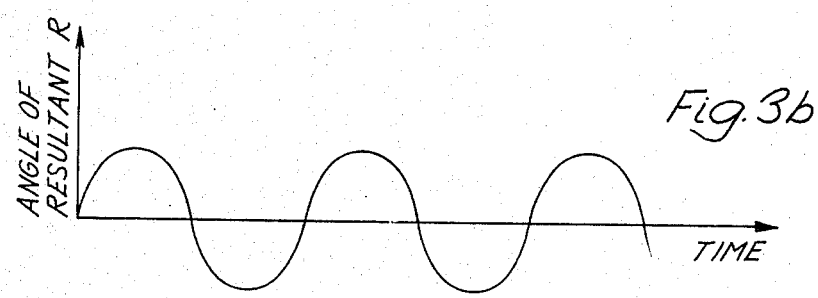
Figure 3C:
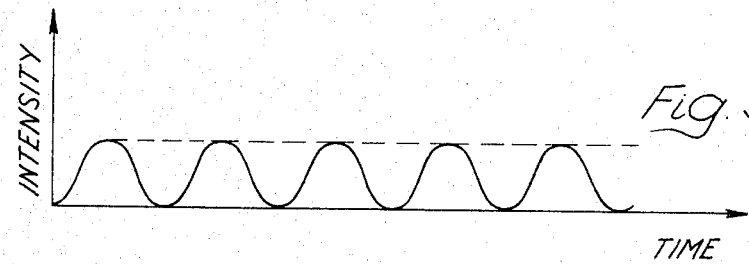
Figure 3D:
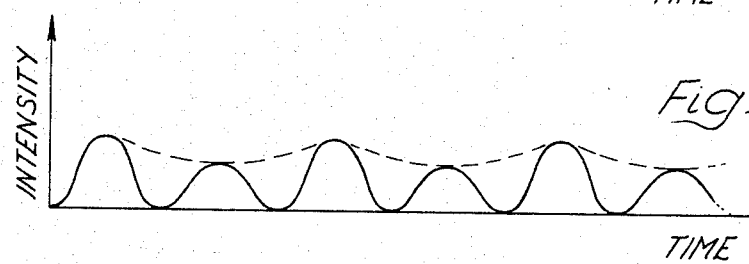

The beams reflected by the reflecting surface 21 pass through the limiting aperture 32 to the electro-optic phase modulator. For coherent input beams of equal amplitude at orthogonal polarisations, the resultant of the interfering beams will be an elliptically polarised beam with its principal axis at an angle of 45° to the P and S directions. The axes of the phase modulator 34 are set along the P and S directions and the axes of the quarter wave plate 36 are set at 45° to the P and S directions. The control circuit 50 is arranged to drive the phase modulator to swing the plane of polarisation of the resultant beam symmetrically about the 45° direction by a large angle such as ±30°, see FIGS. 3(a) and 3(b) which are respectively a polar diagram showing the angles between the input beams and the modulated resultant, and the variation with time of the angle of the resultant. If this modulated beam is viewed by the photomultiplier 42 through the analyser 40 set along the 45° direction, and if the input beams to the modulator 34 are of equal amplitude at precisely orthogonal polarisations with no path difference, then the photomultiplier would receive light having a variation in intensity with time as illustrated in FIG. 3(c), (because it is not sensitive to the direction of polarisation, merely to the light intensity) and would sense a series of sine waves of equal amplitude at twice the modulation frequency and give an output essentially constant as shown by the broken line. However, if the interfering beams are out of phase, they will not have a resultant at 45°, and the resultant will not be swung equally about the 45° direction but will be weighted or biased to one side or the other. The photomultiplier output therefore views successive sine waves at twice the modulation frequency and at alternately differing amplitudes, as shown in FIG. 3(d), and an error signal at the modulation frequency appears at the photomultiplier output, as indicated by the broken line. This signal is fed to a phase sensitive detector and compared with the phase of the modulation, providing a d.c. output directly related to the phase difference between the two interfering beams.

In the present apparatus, the d.c. output is used to drive the Faraday cell compensator 38 in a conventional electro-optic servo system. The current in the Faraday cell is directly proportional to the phase difference between the interfering beams.

To set up the apparatus before use, with the doublet 22, 24 absent the microscope objective lens 28 is altered in axial position until the test surface 30 is focused. With the analyser 40 set at 45°, the polariser 18 is rotated until the required amplitudes are equal—this is sensed by a null on the photomultiplier 42. The doublet 22, 24 is now put in position. Since it is much weaker than the objective lens 28, it alters the focal position by only a small amount. The objective is now adjusted until the one beam is focused on the test surface. The Faraday cell 38 and feedback circuitry are switched on and an electrical output directly proportional to the surface roughness obtained from the measure 58 of the Faraday cell current. Thus, when the test surface is scanned across the focus, a measure of roughness is obtained.

Operation of the apparatus depends on a difference in phase between the two components polarised in different directions; the fact that the amplitudes need not be identical, as this would only reduce the interference contrast, is useful if the two parts of the test surface from which the beams are reflected have different reflectivities, e.g. at a step on an integrated circuit substrate. This is additional to the advantages of a common path for both beams and the high accuracy provided by phase sensitive polarimetry in the sensing circuit.

It is a major advantage of the embodiment of the apparatus illustrated in FIG. 1 that the reflector intercepts half of the incident laser beam, and directs the returning beam along an offset optical path, thus the beam reflected by the test surface does not return to the laser and therefore does not interfere with the laser output beam. In a highly sensitive instrument, such as the apparatus according to the invention, this improvement in laser stability is highly desirable.

In the illustrated embodiment the incident and returning beams are contiguous along the optical axis of the apparatus. This is not essential and the beams can be completely separated but contiguous beams maximise the usable beam cross section and therefore maximize the available optical input to the electrical measuring circuit, and they also enable the minimum size of the focused spot to be achieved.

To set up the apparatus, the reflector 20 is removed and light reflected by the surface 30 passes through the polariser 18 and plate 16 to the beam splitter 14 which transmits part of the beam through a polariser 44 to an observer 46. The observable beam can be used to focus the interferometer on a feature within the 100 micron area of one polarised beam.

Several variations of the apparatus are possible. By use of a different birefringent element 22, such as a Wollaston prism or a Savart plate, the P and S beams can be brought to foci in the same focal plane slightly displaced from each other but overlapping as shown in FIG. 2(b). By use of a stronger prism, the two foci can be completely separated as shown in FIG. 2(c). Instead of a circular beam, a rectangular beam can be provided either partly sheared (FIG. 2(d)) or fully separated (FIG. 2(e)), by use of conventional filtering techniques. In such arrangements, the advantage of a true common path interferometer are lost. If a cylindrical surface is to be investigated, a focused slit with the slit in a direction parallel to the cylinder axis can be used.

In FIG. 2(a), the areas illuminated by the P and S beams differ by a factor of about $10^4$; this factor is useful when surface roughness is to be measured. However, in some circumstances a smaller factor may be tolerable, for example a factor of 10. If a measuring area about 0.75 micrometers in diameter and a reference area about 3 micrometers in diameter are used, the areas differ by a factor of 16. It has been found that such an arrangement is particularly appropriate when the detailed features of a step change in height are to be investigated; for example the sharpness of a step change of a feature on a micro electronic circuit may be of interest.

A second embodiment of the invention is illustrated in FIG. 4. The majority of the items of apparatus are identical and are given the same reference numerals. The difference from FIG. 1 is that the reflector 20 with its angled reflecting surface 21 are replaced by a non-polarising beam splitter 60, and the full aperture of the system is used.

The non-polarising beam splitter 60 consists of two right triangular prisms 62 of zero stress glass cemented to form a cube all external faces of which are covered by anti-reflection coatings. The hypoteneuse of one prism is covered with a layer of aluminium 10 nanometers thick and this face is cemented to the corresponding face of the other prism which is coated to suppress reflection at the boundary layer of the cement. The coatings and cement are not illustrated separately. Usually a zero stress glass has a high refractive index such as 1.84 while the highest glass cement at present known has a refractive index of about 1.58. It is therefore essential to use anti-reflection coatings on the bonded surfaces also.

Such a beam splitter has the property that the products of the reflection and transmission coefficients R and T of the orthogonally polarised components fulfil the condition $R_pT_s$ approximately equals $R_sT_p$, where P is the component vibrating parallel to the plane of incidence and S is the component vibrating perpendicular to the plane of incidence. Thus the double passage of the beam through the beam splitter does not alter the relative phases of the P and S components in the beam. Although the amplitudes of the P and S components can be equalised by rotation of the polariser 18, the apparatus is in fact insensitive to amplitude variations.

The P and S axes of the beam splitter 60 are set to coincide with the P and S axes of the birefringent lens 22.

In the FIG. 4 arrangement the beams incident on and reflected by the test surface are coincident and the full aperture of the apparatus is used. Some radiation may be reflected back to the laser 10 but this may be tolerable.

Several variations of the apparatus are possible:

the birefringent element may be a single birefringent lens instead of a doublet and may be of positive or negative power; it is also possible to use interferometric heterodyning techniques to measure the phase difference between the interfering orthogonally polarised beams, however this would have the disadvantage of necessitating the use of a frequency stabilised laser with a Zeeman splitting facility;

in a transmission system for use with a transparent object, an additional birefringent focusing system identical in power to the one in the incident beam is required in the transmitted beam, or alternatively the amplitudes of the transmitted beams may be analysed photometrically;

the electro-optic phase modulator 32 may be replaced by an a.c. Faraday cell; however the system would then be dependent on the relative amplitudes of the interfering beams;

since the coherence length is determined by the step change in height or roughness of the test surface, it is relatively short and the long coherence length of a laser is not an essential feature. Thus the laser 10 may be replaced by a filtered white light source. The photomultiplier may then be replaced by a silicon detector sensitive to white light.

If an automatic focussing system is employed, by using some form of focus scanner to cause relative movement between the focal plane of the position of the focused polarised beam and surface under test, information about the surface profile can be obtained by analysing the photo-detector signals at the scanning frequency.

This method of analysing the interfering beams can be used in place of the Faraday cell system but it requires a considerable amount of computation to interpret the output, and it is not insensitive to the relative amplitudes of the interfering beams.

It is an advantage of all forms of the apparatus that an optical path difference is sensed in terms of rotation of vibration plane. An optical path difference of one half wavelength is equivalent to changing the phase between the intefering beams by 180° and results in a rotation of the plane of polarisation of the resultant by 90°. (N.B. a change of $\lambda/2$ in path difference is caused by a change in surface level of $\lambda/4$). For a helium-neon laser operating at 632.8 micrometers, a 90° rotation is equivalent to a change in surface level of 158.2 micrometers. It is conventional in polarimetry to measure rotation to better than 0.01°, which is equivalent to 0.01 nanometers hence the great accuracy of the apparatus according to the invention.

It is claimed:

1. A surface profile interferometer comprises means for providing a collimated beam of radiation having components of equal amplitude in two orthogonal directions of polarisation;
    a beam directing device;
    a birefringent focusing system for focusing radiation in the two directions of polarisation at different axial positions in space;
    beam inversion means between the birefringent focusing system and the position of a test object; and
    phase sensitive means for sensing any difference in phase between the polarised radiation components;
    the beam directing device being such that it allows passage of at least a part of the collimated beam to the birefringent focusing system, receives from the birefringent focusing system radiation which has been reflected by the surface, and directs it to the phase sensing means, but introduces essentially no difference in phase between radiation components in the two orthogonal directions of polarisation.

2. An interferometer according to claim 1 in which the birefringent focusing system has different focal lengths for radiation at orthogonal directions of polarisation.

3. An interferometer according to claim 2 in which the birefringent focusing system is such that in the focal plane of radiation at one direction of polarisation, the beam of radiation at the orthogonal direction of polarisation has a cross sectional area which is greater than the cross sectional area of the focused beam by a factor of at least ten.

4. An interferometer according to claim 3 in which the factor is at least one thousand.

5. An interferometer according to claim 2 in which the beam of greater cross sectional area surrounds the focused beam in the focal plane.

6. An interferometer according to claim 1 in which the birefringent focusing system is such that the beams of radiation at orthogonal directions of polarisation are focused at equal axial distances and at different positions transverse to the optical axis.

7. An interferometer according to claim 1 in which the beam directing device is a plane reflecting surface arranged on one side of the optical axis to intercept radiation in the collimated beam on said side of the optical axis, and to reflect radiation from the birefringent focusing system on said side of the optical axis to the phase sensitive means.

8. An interferometer according to claim 1 in which the beam directing device is a beam splitter having the property that the product of the reflection coefficient at a first direction of polarisation and the transmission coefficient at the orthogonal direction of polarisation is equal to the product of the transmission coefficient at the first direction of polarisation and the reflection coefficient at the orthogonal direction of polarisation.

9. An interferometer according to claim 1 in which the phase sensitive means comprises in series array an alternating current electro-optical modulator, an electro-optic compensator, a photomultiplier, and a phase sensitive detector, the phase sensitive detector being arranged to provide an electrical output signal related to any difference in phase between two orthogonally polarised interfering beams which are received by the photomultiplier.

10. An interferometer according to claim 1 further comprising scanning means to cause relative movement in the focal plane of the position of the focused polarised beam and a surface under test.

* * * * *